INVENTOR
RUDOLF HAUS
LUKAS ENSING
BY
AGENT

United States Patent Office 2,881,381
Patented Apr. 7, 1959

2,881,381
CIRCUIT ARRANGEMENT FOR SUPPLYING A LOAD

Rudolf Haus, Zurich, Switzerland, and Lukas Ensing, Eindhoven, Netherlands, assignors, by mesne assignments, to North American Philips Company, Inc., New York, N.Y., a corporation of Delaware Application December 14, 1953, Serial No. 398,157

Claims priority, application Netherlands December 22, 1952

3 Claims. (Cl. 321—14)

The invention relates to a device for supplying a load with rectified alternating current, means being provided to control the supply voltage with the aid of a control voltage when the load varies. Thus, by means of the control voltage the supply voltage within given limits can be kept approximately constant or be strongly reduced when a given load current is exceeded.

It is known in such devices to use the direct voltage across the terminals of the load or an alternative voltage which in the same manner varies with varying load, as a control voltage, for example, by causing this voltage, if required, with interposition of a direct voltage amplifier, to act upon a control grid of a discharge tube used for the rectification in a manner such that the series resistance formed by the tube decreases as the load increases. In such devices usually a high short-circuit current occurs if the load is short-circuited.

The object of the invention is to indicate a device of the above-mentioned kind in which in a different manner by very simple means within given limits an approximately constant or in a determined manner variable supply voltage and/or a strong limitation of the short circuit current is obtained.

In accordance with the invention, a control voltage is derived by rectification of the alternating voltage component of the rectified alternating voltage.

As is known per se, this voltage may be caused to act upon the control grid of a discharge tube acting as a supply rectifier, if required, with interposition of further tubes, limiters and so forth.

Particular advantages are obtained if a control voltage for a discharge tube connected in series with the load is derived from the alternating voltage component produced at the terminals of the load, which component for this purpose is rectified by the control voltage rectifier. Since in the case of a short circuit the alternating voltage component across the terminals of the load equals zero, so that in the case of a short circuit no control voltage is available, it is in this case obtained that the short circuit current has a very slight value.

If, as is usual, means are provided for smoothing the supply voltage and the alternating voltage component across the terminals of the load consequently is very small, it may be desirable to use an amplifier for this alternating voltage component, which consequently amplifies the alternating voltage before rectification. This may be a simple alternating voltage amplifier.

Usually it is advantageous to derive the alternating voltage from the rectified but not yet smoothed voltage, for example from the first smoothing capacitor or from a resistor included in the main circuit before the filter.

In order that the invention may be readily carried into effect, it will now be described with reference to the accompanying diagrammatic drawing, wherein.

Figure 1:
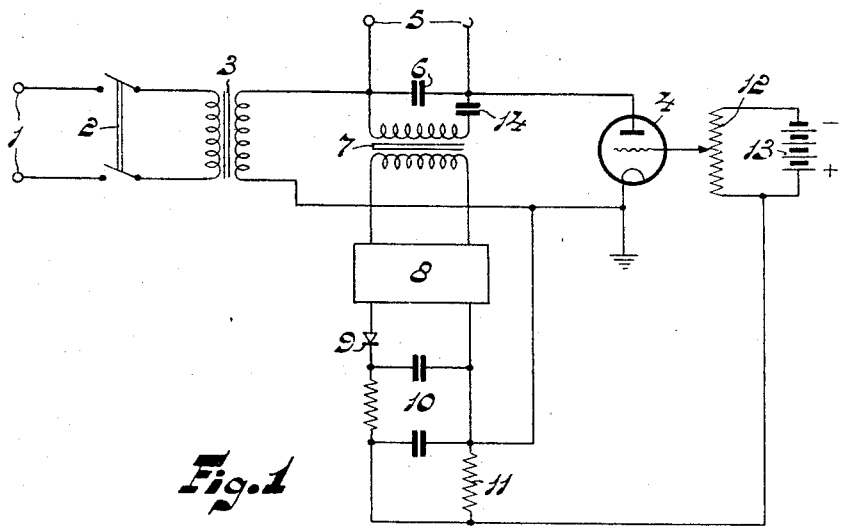
Fig. 1 is a schematic diagram of an embodiment of the circuit arrangement of the present invention.

Referring now to the figures, Fig. 1 shows an embodiment of a device according to the invention in which the voltage of the alternating current supply source is active between terminals 1. If a switch 2 is closed, a load connected between terminals 5 is enabled to be supplied with direct current. This load is connected in series with the secondary of supply transformers 3 and a controlled discharge tube which acts as a rectifier and here is shown as a triode. A capacitor 6 acts to smooth the supply direct voltage in a measure. The control grid of the triode 4 is connected to the sliding contact of a potentiometer 12 which is connected to a source of voltage supply 13. The cathode of the tube is connected to ground. By means of the potentiometer contact the voltage across the terminals 5 of the load can be controlled manually.

In order to ensure automatic control of the voltage across the terminals 5 a transformer 7 is provided, the primary of which is connected to the terminals 5 with interposition of a capacitor 14. Across the secondary of the transformer 7 an alternating voltage is produced which is amplified in an amplifier 8. The output alternating voltage of the amplifier 8 is rectified in a rectifier 9 whereupon the rectified voltage is freed from the alternating voltage component by a filter 10. Thus, across a resistor 11 a direct voltage is set up which is governed by the alternating voltage component across the terminals 5. This voltage acts as a control voltage for the tube 4, for which purpose the resistor 11 is connected between the cathode of the tube 4 and the lower terminal of the resistor 12.

The arrangement of Fig. 1 operates as follows.

In the case of no-load the capacitor 6 is charged up to the peak voltage of the alternating voltage. At no-load the alternating voltage across this capacitor substantially equals zero. It increases with increasing load up to a given maximum and then decreases very quickly. Thus, when the load is increased the negative bias of the control grid of the tube 4 is decreased with the result that the current passing through the tube is enabled to increase. The greater load is consequently entirely or in part compensated for. If required, there may be overcompensation in accordance with the value of the voltage supplied to the control grid. Since, if the terminals 5 are short-circuited, no alternating voltage is active any more between these terminals, the control grid of the tube 4 then is at a high negative potential with the result that the short-circuit current has a very low value. This may be less than the maximum direct current output in normal operation by a factor 3 to 5.

The amplifier 8 can be dispensed with if the supply voltage across the terminals 5 is only slightly smoothed.

It is also possible to take the voltage for the rectifier 9 from the output terminals of a single- or two-phase rectifier connected before the device. In this case the tube 4 only acts as a control tube. Consequently in this case, if no further measures are taken, the advantage of the short-circuit current being very slight is not achieved.

Figure 2:
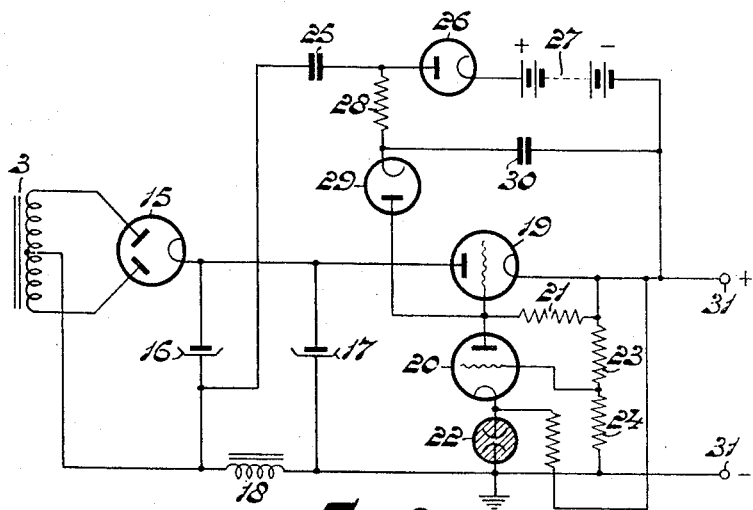
Fig. 2 is a schematic diagram of another embodiment of the circuit arrangement of the present invention.

In the embodiment shown in Fig. 2 the alternating voltage produced by the secondary of the transformer 3 is rectified in two phases by a rectifier 15. The rectified voltage is smoothed by a filter comprising electrolytic capacitors 16 and 17 and a choking coil 18. The apparatus to be supplied is connected to output terminals 31.

A tube 19 connected into the main circuit acts as a control tube for maintaining substantially constant the voltage between the terminals 31 if the load current abstracted therebetween and the supply voltage vary. For this purpose, a series connection of two resistors 24 and 23 is arranged between the output terminals, the common point of which is connected to the control grid of an amplifier tube 20 shown as a triode. The anode of this tube is connected through a resistor 21 to the positive output terminal, its cathode through a glow tube 22 across which a constant voltage is produced to the negative output terminal and also to ground. The anode of the tube 20 is also connected to the control grid of the control tube 19. The assembly forms a supply device known as such which produces a substantially constant voltage.

According to the invention means are provided by which from the ripple voltage a control direct voltage is derived which exercises in this case a control action such that the short circuit current is materially limited. The ripple voltage of the rectified voltage is taken from the first smoothing capacitor 16 and supplied through a capacitor 25 to the anode of a diode 26, the cathode of which is connected to the positive output terminal through a bias voltage source 27. The anode of the diode 26 is also connected through a resistor 28 to the cathode of a second diode 29, the anode of which is connected to the control grid of the tube 19. A capacitor 30 acts to smooth the voltage rectified by the diode 26. As soon as the amplitude of the ripple voltage exceeds a value which is determined by the voltage of the source 27 a voltage is set up at the anode of the tube 26 which is negative with respect to the cathode of the tube 19 due to rectification in the tube 26. The different parts may be dimensioned such that this is effected approximately at full-load, so that under full-load conditions the direct voltage across the capacitor 30 substantially equals zero. Since the control grid of the control tube 19 under normal conditions is negative with respect to the cathode, the diode 29 will not be conducting as long as the load current is less than the full-load current. This keeps the normal operation of the supply device from being affected.

If overloading or a short-circuit occurs, the ripple voltage in the proximity of the capacitor 16 increases strongly. The voltage across the left-hand electrode of the capacitor 30 then becomes strongly negative with the result that the tube 29 becomes conducting and the tube 19 becomes less conducting or non-conducting. It has been found that in this manner the short-circuit current can be limited to approximately double the current intensity in the case of no-load.

Figure 3:
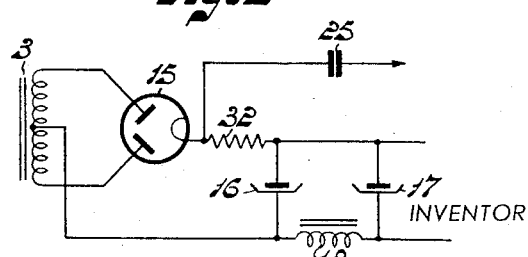
Fig. 3 is a schematic diagram of a modification of a portion of the embodiment of Fig. 2.

It is also possible for the ripple voltage which is to be rectified to be taken from a resistor, such as resistor 32, connected in the main circuit immediately after the input rectifier 15, as is shown in Fig. 3. This has the advantage that the control voltage is less dependent on the frequency.

While the invention has been described by means of specific examples and in specific embodiments, we do not wish to be limited thereto, for obvious modification will occur to those skilled in the art without departing from the spirit and scope of the invention.

What is claimed is:

1. An arrangement for supplying a load with rectified alternating current, comprising means for deriving a rectified alternating current voltage having an alternating voltage component therein, said means including an electron discharge tube having a control grid, means for applying said rectified voltage to said load, rectifying means for deriving a control voltage from said alternating voltage component, means responsive to said control voltage for controlling the magnitude of said rectified alternating current voltage, said last-mentioned means including said discharge tube, said control voltage being applied to said control grid whereby said rectified alternating current voltage remains substantially constant when the load current varies within given limits, and means for applying a manually adjustable voltage to said control grid.

2. A circuit arrangement for supplying a load with rectified alternating current, comprising means for deriving a rectified alternating current voltage having an alternating voltage component therein, said means comprising first rectifying means and an electron discharge tube having a control grid, said discharge tube being connected in series circuit arrangement with said first rectifying means and said load, means including said electron discharge tube for maintaining a substantially constant voltage across said load, second rectifying means for deriving a control voltage from said alternating voltage component, and means for transferring control of said discharge tube from said constant voltage means to said control voltage when the load current exceeds a predetermined value thereby to substantially reduce the magnitude of the voltage across said load, said last-mentioned means comprising means for applying said control voltage to said control grid.

3. An arrangement for supplying a load with rectified alternating current, comprising means for deriving a rectified alternating current voltage having an alternating voltage component therein, means for applying said rectified voltage to said load, rectifying means for deriving a control voltage from said alternating voltage component, said rectifying means comprising a rectifier having a threshold voltage at which said control voltage is only produced under approximately full-load conditions, and means responsive to said control voltage for controlling the magnitude of said rectified alternating current voltage, said control voltage having values at which said responsive means maintains said rectified alternating current voltage substantially constant when the load current varies within given limits and substantially limits the magnitude of short circuit currents in said load.

References Cited in the file of this patent
UNITED STATES PATENTS

| | | |
|---|---|---|
| 1,621,443 | Trevor | Mar. 15, 1927 |
| 1,995,404 | Stoller | Mar. 26, 1935 |
| 2,063,648 | Willis | Dec. 8, 1936 |
| 2,373,297 | Dortort | Apr. 10, 1945 |
| 2,609,524 | Greene | Sept. 2, 1952 |
| 2,730,668 | Edelman | Jan. 10, 1956 |
| 2,734,160 | Franks et al. | Feb. 7, 1956 |